March 28, 1961  F. D. ROSI ET AL  2,977,477
SEMICONDUCTIVE MATERIALS FOR INFRARED TRANSMISSIVE COMPONENTS
Filed May 28, 1958  2 Sheets-Sheet 1

INVENTORS
FRED D. ROSI &
RUBIN BRAUNSTEIN
BY
ATTORNEY

INVENTORS
FRED D. ROSI &
RUBIN BRAUNSTEIN
BY
ATTORNEY

United States Patent Office 2,977,477
Patented Mar. 28, 1961

2,977,477

SEMICONDUCTIVE MATERIALS FOR INFRARED TRANSMISSIVE COMPONENTS

Fred D. Rosi, Plainsboro, and Rubin Braunstein, Princeton, N.J., assignors to Radio Corporation of America, a corporation of Delaware Filed May 28, 1958, Ser. No. 738,388

7 Claims. (Cl. 250—83)

This invention relates in general to improved semiconductor alloys, and in particular to new semiconductor alloys comprising gallium arsenide and indium arsenide for use in infrared transmissive components. The invention also relates to improved apparatus utilizing the new alloys.

The optical properties of many semiconductor materials are interesting in that although they are completely opaque to light in the visible and ultraviolet region, they are transparent to infrared radiation, even in thick samples. The infrared region extends from about 0.8 micron to about 1000 microns in wavelength. For example, germanium has high transmission to infrared radiation of wavelengths longer than approximately 1.8 microns, and silicon longer than approximately 1 micron. For energy of shorter wavelengths germanium and silicon act as photoconductors, which absorb light energy to provide free charge carriers. According to the band structure theory of materials, photoconduction occurs when sufficient energy is absorbed to raise an electron from the valence band across the forbidden energy gap or band gap to the conduction band. The maximum wavelength at which the photoconductive effect occurs is the wavelength at which the incident radiation has an amount of energy approximately equal to the band gap. For wavelengths beyond this threshold, transmission of the incident radiation occurs.

Besides germanium and silicon, other semiconductor materials are known which transmit infrared. The main interest in transmissive components made of these materials lies in their use as optical windows, filters, lenses and the like. It is particularly desirable for such applications that these materials have discrete and sharply defined threshold wavelengths at which infrared transmission begins, and further that materials be available having any desired threshold over a wide range of the infrared spectrum. The threshold wavelength will hereafter be called the transmission edge.

It is accordingly an object of the present invention to provide an improved semiconductor material.

It is another object of the present invention to provide improved semiconductor materials having sharply defined transmission edges throughout a particular range of the infrared spectrum.

It is also a further object to provide improved apparatus utilizing the improved infrared transmissive materials.

These and further objects may be accomplished according to the present invention wherein it has been discovered that alloys of gallium arsenide and indium arsenide may be produced having discrete and sharply defined transmission edges which range between approximately .90 micron and 3.5 microns, the particular value depending upon the alloy composition. This is equivalent to a band gap variable between .35 electron volt and 1.35 electron volts. These useful properties were found to exist by the discovery that the compounds gallium arsenide and indium arsenide are: (1) miscible in all proportions in solid solution and, hence, form a single phase system throughout the alloy range; and (2) provide a monotonic variation in band gap with alloy composition.

As one example of the use of such materials, during World War II secret signalling systems employed infrared radiation. The infrared sources used produced a considerable amount of visible light. In order to prevent transmission of this visible light long wave filters were required with a transmission edge just beyond the range of the visible spectrum or at about 0.8 micron in wavelength. Such filters were normally made of plastic materials containing dyes or colored glass. By utilizing the materials of the present invention, improved filters are provided having discrete and sharply defined transmission edges in the infrared. In addition, the transmission edge can be varied between .90 micron to 3.5 microns to provide for best performance of the system.

The invention will be described in greater detail with reference to the accompanying drawings wherein similar reference characters are applied to similar elements, and in which.

Figure 1:
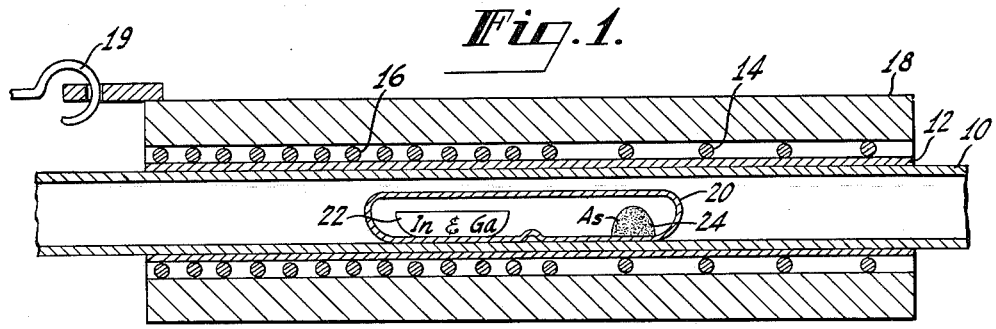
Figure 1 is a cross-section elevation view of a horizontal furnace and a boat type crucible charged with materials for preparing an alloy according to the present invention.

In Figure 1, a gallium arsenide-indium arsenide alloy is made in a horizontal furnace by the gradient-freeze technique. The furnace comprises an inner hollow quartz tube 10 concentric with an outer quartz tube 12. The outer quartz tube 12 can be moved longitudinally over the inner quartz tube 10, which is stationary. Two heating coils 14 and 16 are wound around the outer quartz tube 12, each covering approximately one-half the length of the tube. The turns comprising the heating coil 14 are wide-spaced while the turns comprising the heating coil 16 are close-spaced to provide the required furnace temperature gradient. The ends (not shown) of the coils 14 and 16 are connected to separate controllable power sources (not shown) to produce the required temperatures in each half of the furnace. An outer layer of insulating brick 18 is provided concentric with the coils 14 and 16, and a hook 19 is attached to the insulating brick 18 to provide means for moving the entire furnace structure over the length of the quartz tube 10.

A hollow ampule 20 contains at one end a quartz boat 22 into which a charge of gallium and indium is placed. A typical charge would be 15 grams of gallium and 15 grams of indium of the highest purity obtainable. For the purposes of this invention it is desirable that impurity centers in the material do not exceed $10^{17}$ per cubic centimeter in order to minimize transmission losses. A charge of arsenic 24 is placed in the opposite end of the ampule. An excess of arsenic should be used to continually maintain an arsenic atmosphere in the ampule 20 during reaction time.

With the materials inserted, the ampule is sealed in a vacuum, then inserted in the inner quartz tube 10, and located therein such that the arsenic charge is in the low temperature area of the furnace heated by the coil 14 and the gallium-indium charge is in the high temperature area of the furnace heated by the coil 16. The heating coil 16 is energized to provide a temperature of from 950° C. to 1250° C. depending upon alloy composition, and a temperature of from 550° C. to 650° C. to provide the required atmosphere of arsenic pressure is provided for the arsenic charge by the heating coil 14. At these temperatures the gallium and indium melt and the arsenic vaporizes and diffuses into the melt. These temperature conditions are maintained for about 2 hours to provide for complete melting of the gallium and indium and diffusion of the arsenic into the melt. At the termination of this period the heating coils are moved over the length of the stationary quartz tube 10 at the rate of about 1 to 5 inches per 24 hour period in a direction such that the heating coil 14 moves over the boat 22. Since the temperature provided by the heating coil 14 is between 550°–650° C., which is below the melting point of gallium arsenide or indium arsenide, the gallium arsenide-indium arsenide melt will progressively solidify. At the same time, a continuous atmosphere of arsenic will be maintained in the ampule 20.

Figure 2:
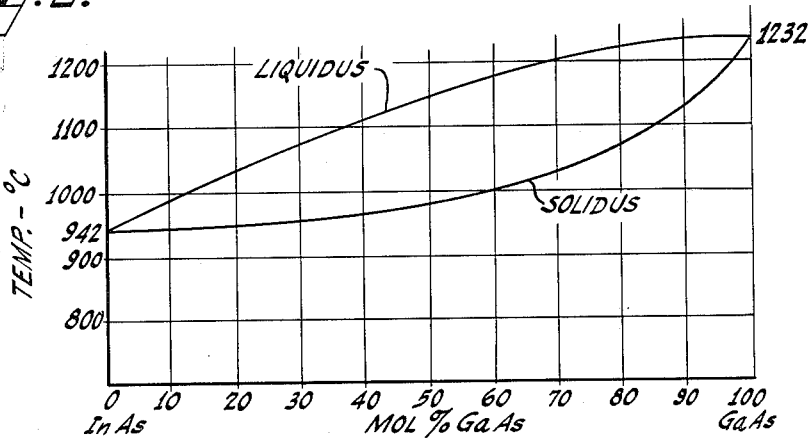
Figure 2 is a phase diagram for the system indium arsenide-gallium arsenide.

In the phase diagram for the system indium arsenide-gallium arsenide shown in Figure 2, curve 26 represents the liquidus line and curve 28 the solidus line for the system. The diagram clearly illustrates the complete solid miscibility produced by indium arsenide and gallium arsenide throughout their alloy range. When the gallium arsenide-indium arsenide alloy progressively solidifies from the melt using the method previously described, the composition of the alloy thus formed will vary along the length of the solidified bar in the manner indicated by the solidus line represented by the curve 28. The material which solidifies first will be gallium arsenide-rich and the material which solidifies last will be indium arsenide-rich, with a full range of alloy compositions therebetween. Material of desired composition can be selected from the solidified bar.

An alternative method for making the alloy is to separately form the constituents gallium arsenide and indium arsenide and thereafter melt the two materials in a common vessel. Gallium arsenide can be made by placing a charge of gallium and a charge of arsenic in the ampule 20 and proceeding in the manner previously described. Indium arsenide can be made by utilizing a charge of indium and a charge of arsenic in the ampule 20. To produce gallium arsenide the furnace temperature over the gallium should be adjusted to be between 1250° C. and 1275° C. To produce indium arsenide the melting temperature for the indium should be between 950° C. and 975° C. By controlling the current to the heating coil 16, these temperatures can be obtained. The gallium arsenide and the indium arsenide can then be placed in the desired proportions in a quartz vessel and heated to the melting temperature as determined by the phase diagram of Figure 2.

Assume for example that an alloy of 50% indium arsenide-50% gallium arsenide is desired. According to the phase diagram this alloy will be obtained if the individual constituents gallium arsenide and indium arsenide are heated to the melting temperature of approximately 1145° C. and intermixing of the melted materials is allowed to occur. It is preferable that this be done in an inert atmosphere. To obtain a solidified bar of this composition the slow cooling procedure previously described cannot be used. Instead, after complete intermixing has occurred, it is necessary to quench the material. This can be done by rapidly shifting the cool portion of the furnace which is heated by the coil 14 over the boat containing the melted gallium arsenide-indium arsenide. Rapid cooling prevents gross segregation of the gallium arsenide in the melt. The 50% indium arsenide-50% gallium arsenide alloy thus obtained will be fairly uniform along the length of the solidified bar which is desirable for good infrared transmission.

Figure 3:
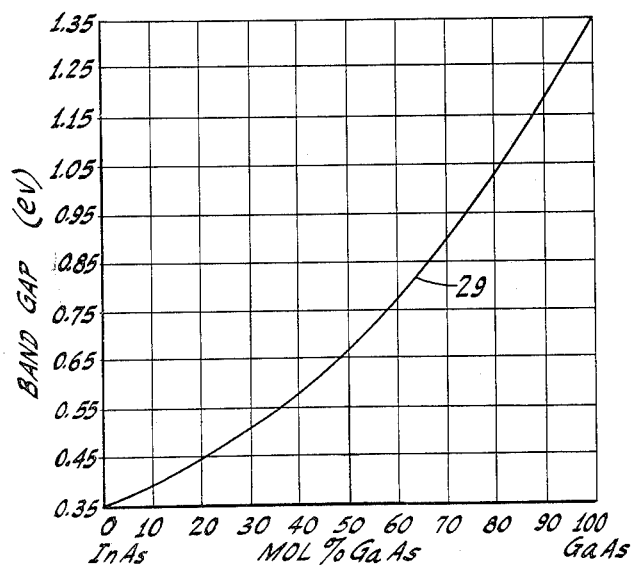
Figure 3 is a graph showing how band gap varies with alloy composition for the material of the present invention.

Figure 3 shows how band gap varies with alloy composition for the gallium arsenide-indium arsenide system. Curve 29 shows the monotonic relationship between these parameters, which accounts in part, for the utility of the system. Utilization of this data permits preparation of a material having a particular desired band gap or transmission edge between certain limits.

Figure 4:
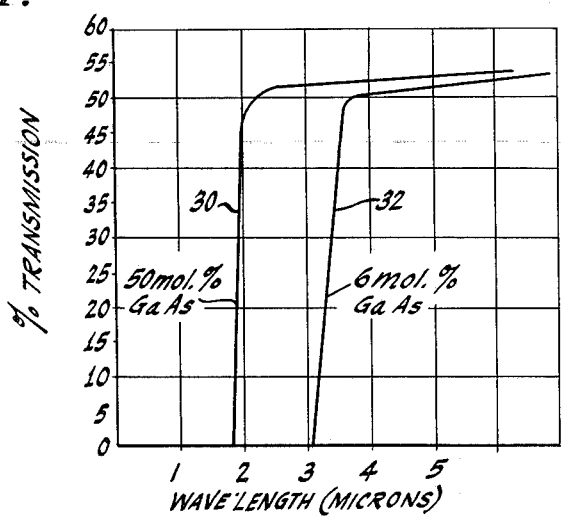
Figure 4 is a graph showing how percentage transmission varies with the wavelength of impinging radiation for two samples of alloy made in accordance with the present invention.

Infrared windows may be made from the prepared alloy by dicing material of desired composition into wafers, and optically polishing the faces of the wafer. The infrared transmission characteristics of two windows made by the techniques heretofore described are shown in Figure 4. Curve 30 represents a gallium arsenide-indium arsenide alloy comprising 50 mol percent gallium arsenide, and having a transmission edge of approximately 1.9 microns, which corresponds to a band gap of approximately .65 electron volt. It is to be noted that the transmission edge is very sharp, and any radiation of wavelengths less than about 1.8 microns will not be transmitted through the material. Curve 32 represents another gallium arsenide-indium arsenide alloy comprising 6 mol percent gallium arsenide, and having a transmission edge of approximately 3.3 microns, which corresponds to a band gap of approximately .37 electron volt. This material also has a sharp and discretely defined transmission edge. A sliding scale of band gaps and transmission edges is available by selecting different alloy compositions. Alloys having composition varying between 6 and 50 mol percent of gallium arsenide have been found to be particularly useful, and data for these extremes is shown. An alloy having 50 mol percent gallium arsenide has a transmission edge just within the short wavelength end of the infrared region.

The samples used to obtain the transmission characteristic of Figure 4 were each on the order of 20 mils in thickness. However, transmission losses are due mainly to absorption by impurities and surface reflection. To minimize absorption loss an impurity center concentration of about $10^{17}$ per cubic centimeter or less is desirable. To minimize reflection losses the window may be coated by vapor deposition of other materials to form an interference layer to decrease the reflectivity.

Figure 5:
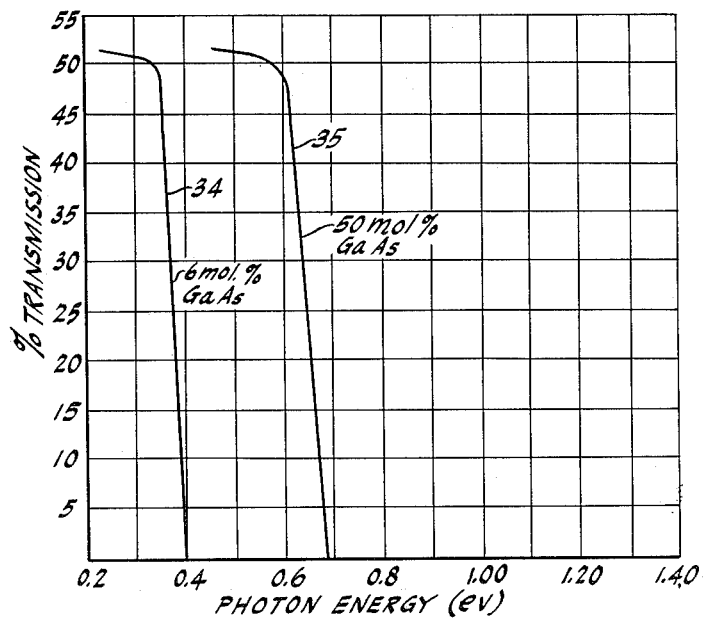
Figure 5 is a graph showing how the percentage transmission varies with impinging photon energy for two samples of alloy made in accordance with the present invention.

Figure 5 shows how infrared transmission varies with the energy of impinging radiation, for the same two samples of gallium arsenide-indium arsenide alloy heretofore specified. Curve 34 represents the alloy comprising 6 mol percent gallium arsenide and curve 35 represents the alloy comprising 50 mol percent gallium arsenide. These curves illustrate another method of presenting the data of Figure 4, and again illustrate the discrete and sharply defined band edges for the materials. The curves of Figure 4 are related to those of Figure 5 by the relation $\lambda = 1.237/E$ where E is the band gap of the material. Curves 32 and 34 are corresponding, and curves 30 and 35 are corresponding, according to this equation.

Figure 6:
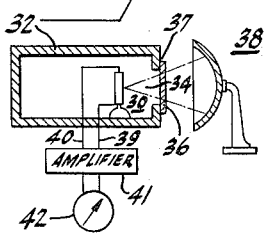
Figure 6 is a pictorial view partly in cross-section of a device utilizing a window made from a material in accordance with the present invention.

In a device shown in Figure 6 utilizing an infrared window made in accordance with the invention, an infrared sensitive device 30 which may be a thermocouple, for example, is mounted in an enclosure 32. The enclosure 32 shields the device 30 from ambient radiation, especially in the infrared range. An aperture 34 is cut in the front wall of the enclosure 32 opposite the infrared sensitive device 30. In accordance with the invention, the aperture 34 is covered with a window 36 made of a gallium arsenide-indium alloy. This window maintains the physical integrity of the enclosure yet allows a desired range of infrared radiation to be transmitted to the device 30. The composition of the window 36 may be selected in accordance with Figures 2 and 3 to provide a system sensitive to any desired range of infrared radiation above the transmission edge of the window 36. The window 36 may be sealed in place by any convenient means such as a wax seal 37 or a cement. Infrared radiation may be directed upon the device 30 by a reflector 38 or by any other source of infrared radiation. The reflector 38 serves to concentrate received radiation and also provides direction sensitivity for the system. Electrical leads 39 and 40 connect the device 30 to an amplifier 41, the output of which is applied to an indicator such as a meter 42.

Figure 7:
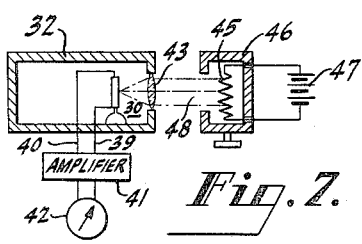
Figure 7 is a pictorial view partly in cross-section of a device utilizing a lens made from the material in accordance with the present invention.

In a modification of the system shown in Figure 7, a lens 43 is fitted in the aperture 34 in place of the window. The lens 43 is shown as a dual convex type for illustrative purposes only, other types being equally applicable. The lens 43 is composed of a gallium arsenide-indium arsenide alloy and is therefore operative to focus infrared radiation above a threshold wavelength onto the device 30. The source of infrared radiation is shown as a Globar 45 mounted in an enclosure 46 and heated to incandescence by a battery 47. The enclosure has an opening 48 which directs radiation towards the lens 43. A Globar is a particularly rich source of infrared radiation. The lens 43 eliminates any response in the system due to ambient radiation. The lens further improves the system sensitivity by concentrating incoming radiation on a small area of the detector 30.

From the foregoing it will be apparent that novel alloys have been discovered composed of gallium arsenide-indium arsenide and that improved infrared detecting devices utilizing these alloys have been provided.

What is claimed is:
1. In a device for detecting infrared energy, a window composed of a solid solution alloy of crystalline gallium arsenide and indium arsenide.
2. A semiconductor crystalline material comprising an alloy for crystalline gallium arsenide and indium arsenide.
3. The material of claim 2 wherein said alloy comprises between 6 and 50 mol percent of said gallium arsenide.
4. The material of claim 3 wherein said alloy has a band gap between .37 and .65 electron volts.
5. In a system for detecting infrared energy comprising, in combination, an infrared sensitive element, and means to shield said element from unwanted radiation, means to expose said element to a desired radiation field, said last named means including a window comprising an alloy of crystalline indium arsenide-gallium arsenide.
6. The system of claim 5 wherein said alloy comprises between 6 and 50 mol percent gallium arsenide.
7. A material according to claim 6 having a transmission edge between 1.9 microns and 3.3 microns.

References Cited in the file of this patent
UNITED STATES PATENTS
2,800,023    Obermaier _____ July 23, 1957
FOREIGN PATENTS
S 40,619    Germany _____ May 24, 1956
OTHER REFERENCES
Uber neue halbleitende Verbindungen, by Von H. Welker, from Z. Naturforsch, V. 7a, 1952, pages 744–749.